United States Patent [19]

Kohler

[11] Patent Number: 4,582,267
[45] Date of Patent: Apr. 15, 1986

[54] ANTIFRICTION MOUNTING FOR A CONE CRUSHER

[75] Inventor: Horst-Dietmar Kohler, Herzogenaurach, Fed. Rep. of Germany

[73] Assignee: INA Walzlager Schaeffler KG, Fed. Rep. of Germany

[21] Appl. No.: 631,610

[22] Filed: Jul. 17, 1984

[30] Foreign Application Priority Data

Aug. 25, 1983 [DE] Fed. Rep. of Germany ....... 3330586

[51] Int. Cl.⁴ .............................................. B02L 2/04
[52] U.S. Cl. ................................................. 241/214
[58] Field of Search ............................. 241/207–216, 241/286, 290

[56] References Cited
U.S. PATENT DOCUMENTS 4,477,030 10/1984 Vifian et al. ....................... 241/208

Primary Examiner—Howard N. Goldberg
Assistant Examiner—Timothy V. Eley
Attorney, Agent, or Firm—Bierman, Peroff & Muserlian

[57] ABSTRACT

A rolling bearing arrangement for a cone crusher comprising a vertical drive shaft arranged within a housing and in alignment with a conical crusher jacket, the upper end of the drive shaft being slightly inclined to the axis of the crusher jacket and having a crusher cone mounted on said upper end, the crusher cone being supported by at least one radial rolling bearing and by a first thrust rolling bearing arranged at the lower end of the crusher cone, characterized by a second thrust rolling bearing arranged above the radial rolling bearing between the drive shaft and spring-elastic means (12) are provided which take support on the one hand on the shaft (2) and, on the other, on the end face of the thrust rolling bearing (11) away from the thrust rolling bearing (10) and in so doing brace these two thrust rolling bearings against one another.

4 Claims, 1 Drawing Figure

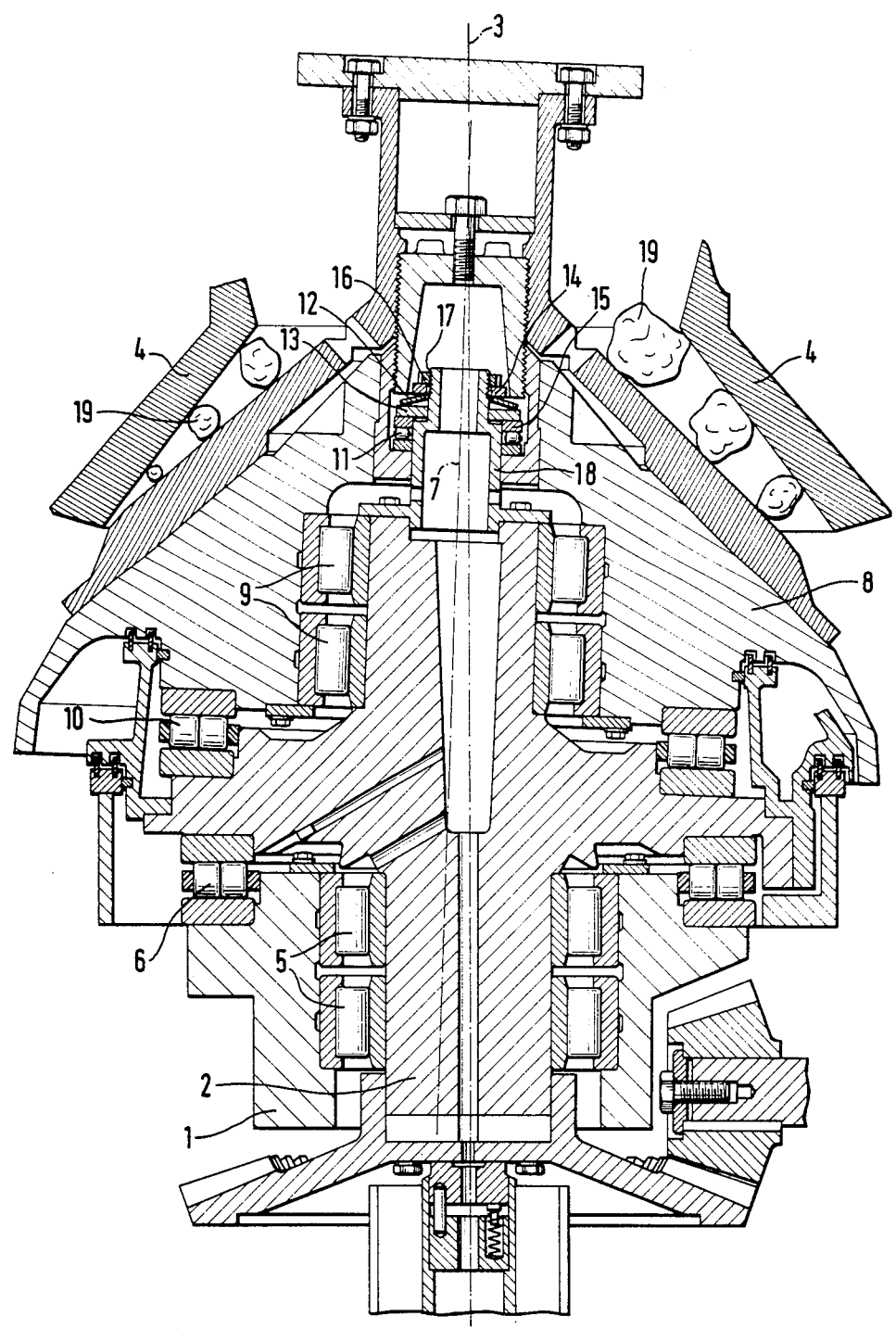

ANTIFRICTION MOUNTING FOR A CONE CRUSHER

STATE OF THE ART

The antifriction mounting in cone crushers is subjected to a particularly great degree to constantly changing loads because the crusher cone performs tumbling, percussive motions relative to the crusher jacket through which hammerlike blows are incessantly exerted on the material to be crushed which is falling downwardly in a circular zone. The thrust roller bearing disposed between the drive shaft and the crusher cone in particular is subjected to severe accelerations and decelerations as well as constantly changing moments and there occur in this bearing gliding and tilting motions which lead to a premature failure of the bearing and, hence, to high repair costs and long downtimes.

OBJECTS OF THE INVENTION

It is an object of the invention to avoid the disadvantages of the prior art and to improve such an antifriction mounting in simple manner so that the life of the thrust roller bearing is significantly prolonged and the operating costs are considerably reduced.

This and other objects and advantages of the invention will become obvious from the following detailed description.

THE INVENTION

The novel rolling bearing arrangement for a cone crusher comprises a vertical drive shaft, arranged within a housing and in alignment with a conical crusher jacket, the upper end of the drive shaft being slightly inclined to the axis of the crusher jacket and having a crusher cone mounted on said upper end of the crusher cone being supported by at least one radial rolling bearing and by a thrust rolling bearing arranged at the lower end of the crusher cone and is, characterized by a second thrust rolling bearing arranged above the radial rolling bearing between the drive shaft and the crusher cone, said second thrust rolling bearing being subjected to elastic spring means to preload the two thrust rolling bearings against each other.

By preloading the two thrust roller bearings against each other by the elastic spring means, the disturbing gliding and tilting motions are reliably prevented so that perfect operation of the thrust roller bearing is assured in spite of the changing operating conditions and a considerable prolongation of its life is achieved.

In an advantageous embodiment of the invention, a diaphragm spring is provided as the elastic spring means and according to a further development of the invention, it is possible for the diaphragm spring to be supported on the one hand by a race of the thrust roller bearing and on the other by an adjusting means. It is clear that the problem underlying the invention is solved by a simple means which, by comparison, requires much less expense than the replacement of a failed bearing.

In another feature of the invention, a nut may be provided as a setting means which interacts with a thread on the shaft. With it, the necessary preload can be set unproblematically and exactly, where-upon the nut can be locked to the shaft in a manner known per se.

The FIGURE is a longitudinal cross-sectional view of one embodiment of a cone crusher of the invention.

The cone crusher of the FIGURE consists of a housing 1 in which a vertical drive shaft 2 is mounted in a radial roller bearing 5 and a thrust roller bearing 6 in alignment with the axis 3 of a conical crusher jacket 4. The upper end of the drive shaft 2 has an axis 7 which is slightly inclined to the axis 3 of the crusher jacket 4 and supports the crusher cone 8 in this area. The cone 8 is supported by drive shaft 2 via a radial roller bearing 9 and via a thrust roller bearing 10 disposed at its lower end. Inserted above the radial roller bearing 9 between drive shaft 2 and crusher cone 8 is a second thrust roller bearing 11 which is acted upon by diaphragm spring 12 so that it and the lower thrust roller bearing 10 are preloaded against each other. In the example shown, the diaphragm spring 12 is clamped between washers 13 and 14 with washer 13 supported by race 15 of the thrust roller bearing 11 and washer 14 by nut 16.

The nut 16 serves for adjustment of the required preload and for this purpose interacts with thread 17 provided on cylindrical extension 18 of the drive shaft 2. When drive shaft 2 is caused to rotate by a drive unit not shown, crusher cone 8 performs a tumbling, percussive motion relative to crusher jacket 4 through which hammerlike blows are exerted on the material 19 to be crushed which is indicated between crusher cone 8 and crusher jacket 4. Due to the thrust roller bearings 10 and 11 being preloaded against each other, a gliding and tilting motion in the lower thrust roller bearing 10 is prevented despite the constantly changing loads.

Various modifications of the apparatus of the invention may be made without departing from the spirit or scope thereof and it should be understood that the invention is intended to be limited only as defined in the appended claims.

What I claim is:

1. A rolling bearing arrangement for a cone crusher comprising a vertical drive shaft arranged within a housing and in alignment with a conical crusher jacket, the upper end of the drive shaft being slightly inclined to the axis of the crusher jacket and having a crusher cone mounted on said upper end, the crusher cone being supported by at least one radial rolling bearing and by a first thrust rolling bearing arranged at the lower end of the crusher cone, characterized by a second thrust rolling bearing arranged above the radial rolling bearing between the drive shaft and spring-elastic means (12) are provided which take support on the one hand on the shaft (2) and, on the other, on the end face of the thrust rolling bearing (11) away from the thrust rolling bearing (10) and in so doing brace these two thrust rolling bearings against one another.

2. A cone crusher of claim 1 wherein the spring elastic means is a diaphram spring.

3. A cone crusher of claim 2 wherein the said spring is supported by a race of the thrust roller bearing and by an adjusting means.

4. A cone crusher of claim 3 wherein the adjusting means is a nut which interacts with a thread of the shaft.

* * * * *